Jan. 13, 1925.  
B. H. HOWARD ET AL  
FEEDER FOR INGOT MOLDS  
Filed Nov. 1, 1924
1,523,203
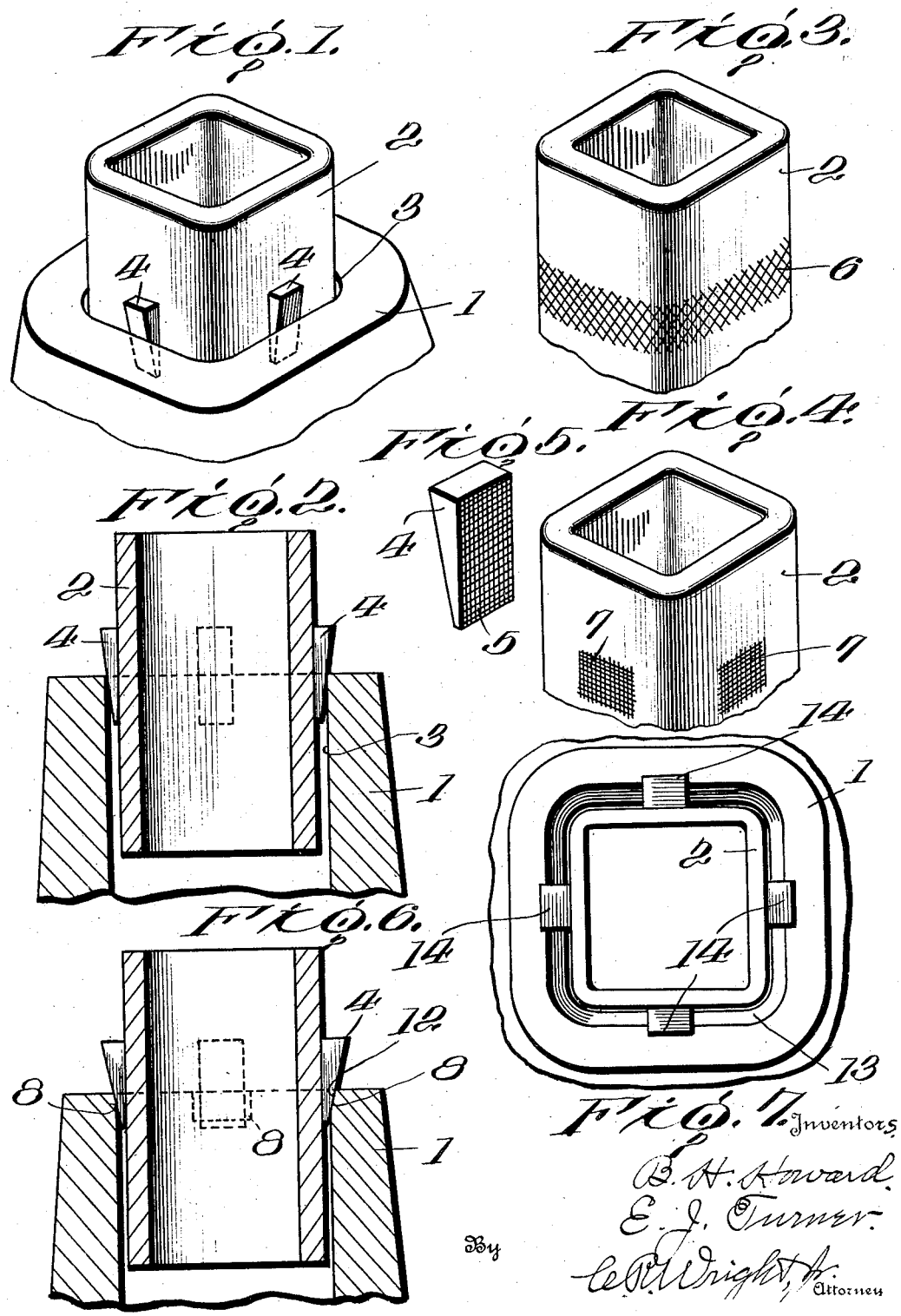

Patented Jan. 13, 1925.

1,523,203

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

FEEDER FOR INGOT MOLDS.

Application filed November 1, 1924. Serial No. 747,325.

*To all whom it may concern:*

Be it known that we, BLOOMFIELD H. HOWARD and ERNEST J. TURNER, citizens of the United States, residing, respectively, at Washington, District of Columbia, and Pittsburgh, in the county of Allegheny and State of Pennsylvania, have invented certain new and useful Improvements in Feeders for Ingot Molds, of which the following is a specification.

Our invention relates to improvements in feeders for ingot molds used in the manufacture of iron or steel ingots and the object of the invention is to prevent holes and seams in the upper end of the ingot known as "piping" and at the same time produce a feeder in which segregation is reduced to a minimum.

Another object of our invention is to provide a feeder for ingot molds in which the feeder can be vertically adjusted in the molds so that ingots of a greater or less length can be readily cast in the same mold.

A further object of our invention is to provide a feeder of this character in which the mold and feeder can be made in practically tubular form, the holding and adjusting means being entirely independent of the feeder.

A still further object of our invention is to provide a simple, cheap and effective feeder of this character having certain details of structure and combination of parts hereinafter more fully set forth.

In the accompanying drawings:

Figure 1 is a perspective view of an ingot mold showing the feeder adjustably held in the mold.

Figure 2 is a transverse vertical sectional view of Figure 1.

Figure 3 is a perspective view of the upper end of the feeder showing the outer face roughened so as to more firmly grip the wedges.

Figure 4 is a perspective view of the upper end of the feeder showing a modified form of the roughened surface.

Figure 5 is a perspective view of one of the wedges.

Figure 6 is a vertical transverse sectional view similar to Figure 2 showing the upper edges of the mold provided with recesses for the reception of the wedges.

Figure 7 is a top plan view showing the upper end of the ingot mold beveled all the way around.

Referring now to the drawings, 1 represents the mold and 2 the feeder. The mold is constructed in any desired form and the feeder of a tubular form to fit within the bore 3 of the mold. In this invention the feeder 2 has an exterior diameter slightly less than that of the bore of the mold, and when the feeder is adjusted the proper distance in the bore of the mold, the wedges 4 are driven in between the outer face of the feeder and the wall of the mold. The outer faces of the wedges may be roughened as indicated at 5 so as to increase the friction between the wedge and the feeder. The exterior faces of the feeder 2 and the inner faces of the wedges will frictionally engage the feeder to a sufficient degree to hold the feeder against longitudinal and downward movement within the bore of the mold.

In Figure 3 however we have shown the exterior face of the feeder 2 roughened as indicated at 6 which will absolutely prevent the feeder from slipping on the inner faces of the wedges. This roughened surface as shown extends entirely around the four walls of the feeder.

In Figure 4 the feeder 2 on all four sides are provided with small roughened surfaces 7.

In Figure 6 of the drawings the mold 1, adjacent its upper edges is provided with four recesses 8 of a width equal to that of the wedge 4 and into which the wedges extend, and are prevented from slipping downwardly within the mold by the wedging action on the beveled faces 12 of the recesses.

In Figure 7 the upper end of the bore of the mold is beveled as indicated at 13 whereby the wedges 14 can be inserted at any desired point and as many wedges inserted as desired.

While we have shown and described these various ways of carrying out our invention, it will be understood that the same could be varied without departing from our invention, as the broad invention lies in adjustably holding a plain tubular feeder in the bore of the mold 1 in any desired position.

Having thus fully described our invention what we claim is:

1. A feeder for ingot molds comprising a refractory body portion adapted to be frictionally adjustably supported in the upper end of the mold.

2. A feeder for ingot molds comprising a refractory body portion having a roughened surface adapted to engage wedges for supporting the same in the upper end of a mold.

3. The combination with a mold of a feeder of refractory material having an exterior diameter less than the bore of the mold, and wedges between the outer face of the body portion and the wall of the mold for supporting the feeder in the mold.

4. The combination with an ingot mold of a feeder of refractory material having an exterior diameter less than the bore of the mold, and having its outer face roughened, and wedges placed between the roughened faces and the wall of the mold for supporting the feeder in the mold.

5. The combination with an ingot mold of a feeder of refractory material having an exterior diameter less than the bore of the mold and roughened, and wedges having roughened outer faces placed between the roughened outer face of the feeder in the bore of the mold for supporting the feeder in any adjusted position within the mold.

6. The combination with an ingot mold of a feeder of refractory material having an exterior diameter less than the bore of the mold, the upper end of the mold having notches, and wedges within said notches and engaging the outer face of the feeder for supporting the feeder in any adjusted position within the mold.

7. The combination with an ingot mold having a beveled upper end, a feeder of refractory material having an exterior diameter less than the bore of the mold, and wedges between the outer face, body portion and the beveled upper end of the bore of the mold.

In testimony whereof we affix our signatures.

BLOOMFIELD H. HOWARD.
ERNEST J. TURNER.